Aug. 19, 1924. Re. 15,896

C. F. NAYER

TYPE FEEDING DEVICE

Original Filed Nov. 1, 1920 6 Sheets-Sheet 1

Inventor
Carl F. Nayer
Charles Stiles
by Attys

Aug. 19, 1924. Re. 15,896

C. F. NAYER

TYPE FEEDING DEVICE

Original Filed Nov. 1, 1920 6 Sheets-Sheet 2

Inventor
Carl F. Nayer
by Charles Hills
Atty's.

Aug. 19, 1924. Re. 15,896

C. F. NAYER

TYPE FEEDING DEVICE

Original Filed Nov. 1, 1920 6 Sheets-Sheet 3

Inventor
Carl F. Nayer
by Charles W. Hills Attys.

Aug. 19, 1924.
Re. 15,896
C. F. NAYER
TYPE FEEDING DEVICE
Original Filed Nov. 1, 1920 6 Sheets-Sheet 4
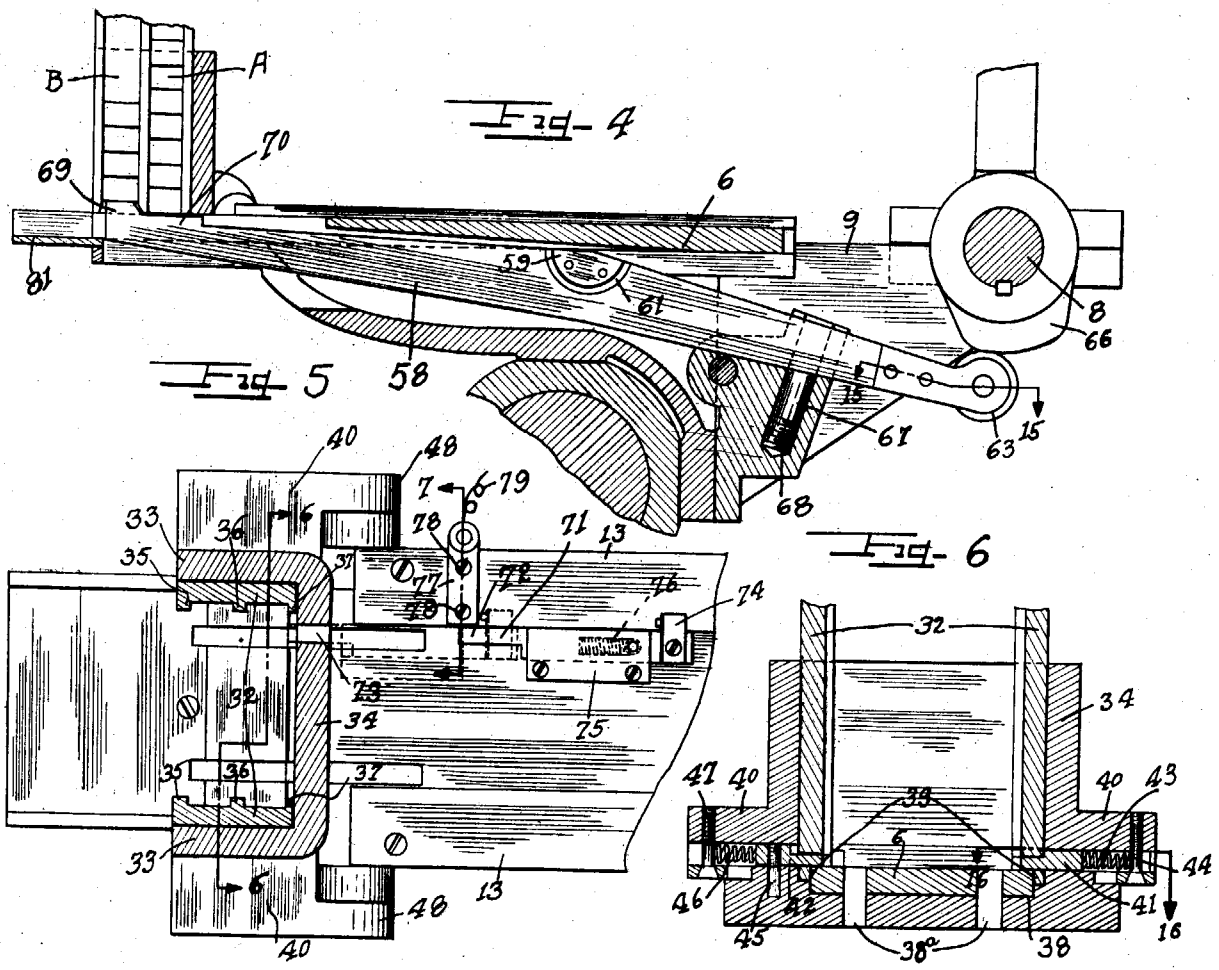
Inventor
Carl F. Nayer
by Charles W. Hills
Attys.

Aug. 19, 1924. Re. 15,896

C. F. NAYER

TYPE FEEDING DEVICE

Original Filed Nov. 1, 1920 6 Sheets-Sheet 5

Inventor

Carl F. Nayer by Charles W. Hills

Atty's

Aug. 19, 1924. Re. 15,896

C. F. NAYER

TYPE FEEDING DEVICE

Original Filed Nov. 1, 1920 6 Sheets-Sheet 6

Inventor
Carl F. Nayer
by Charles A. Ellis
Attys.

Reissued Aug. 19, 1924. Re. 15,896

UNITED STATES PATENT OFFICE.

CARL F. NAYER, OF LOS ANGELES, CALIFORNIA, ASSIGNOR, BY DIRECT AND MESNE ASSIGNMENTS, OF ONE-HALF TO WILLIAM E. KIER, OF CHICAGO, ILLINOIS, AND ONE-HALF TO ALBERT I. APPLETON, OF EVANSTON, ILLINOIS.

TYPE-FEEDING DEVICE.

Original No. 1,414,148, dated April 25, 1922, Serial No. 420,866, filed November 1, 1920. Application for reissue filed April 21, 1924. Serial No. 708,079.

*To all whom it may concern:*

Be it known that I, CARL F. NAYER, a citizen of the United States, residing in the city of Los Angeles, county of Los Angeles, and State of California, have invented a new and useful Improvement in a Type-Feeding Device; and I do hereby declare that the following is a full, clear, and exact description of the same, reference being had to the accompanying drawings, and the numerals of reference marked thereon, which form a part of this specification.

This invention relates to a printing press for printing form letters, in which a slug of type containing the name and address of a person is advanced into operative relation with the printing bed plate which comprises a letter form or chase.

It is an object of this invention to provide in connection with existing printing presses of that type having a printing bed plate and an oscillatable platen, mechanism for feeding slugs of type into operative relation with the bed plate upon each actuation of the platen, so that each form letter will have the name and address of the person to whom it is sent, and as the slugs of type may be made to correspond with that of the printing bed plate, the printing of the form letter will be uniform and the address will not be distinguishable from the body of the letter.

It is more specifically an object of this invention to provide a pair of slug holders or galleys in the rear of the bed plate of such a machine with a bearing or runway leading from the bed plate to a point contiguous to the galleys or holders with a reciprocating member on the runway for automatically receiving slugs from one galley and projecting them through a suitable slot or opening in the bed plate in operative relation with the chase on the bed plate and thereafter retracting the same and mechanism for automatically feeding the slugs to the reciprocating members and ejecting them therefrom with respect to the galleys.

In general, the object of the invention seeks to provide a compact, practical and commercial machine which may be cheaply manufactured, which however is efficient and rapid in service. The invention comprises the novel mechanism and combinations hereinafter described and more particularly pointed out and defined in the appended claims.

In the accompanying drawings which illustrate a preferred embodiment of this invention and in which similar reference numerals refer to similar features in the different views, Figure 1 shows an elevational side view of a printing press for printing form letters embodying my invention.

Figure 4 is an enlarged section through the linotype feeding mechanism showing the relation of certain features.

Figure 5 is a fragmentary view showing the top plan view of the ramming mechanism and the slug holders in section.

Figure 6 is a section on the line 6—6 of Figure 5.

Figure 17:
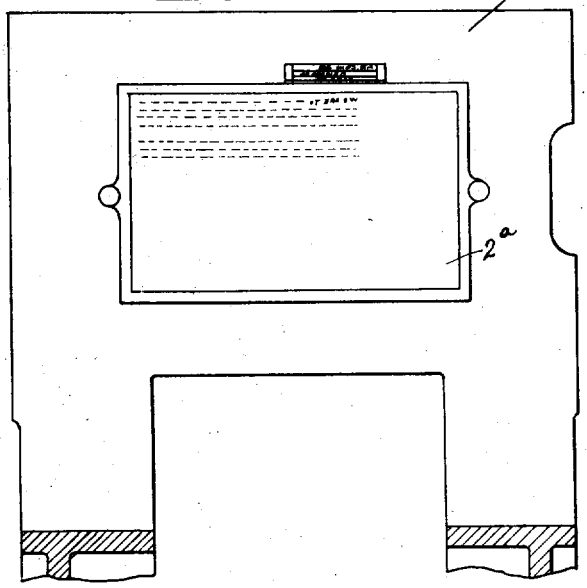

Figure 17 is a perspective view of a type bed plate with a slug projected into position.

Figure 18:
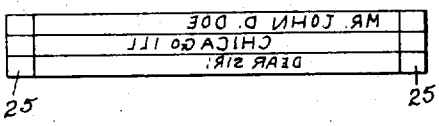

Figure 18 is a block or slug of linotype in the form in which it is contemplated projecting the same.

Figure 10:
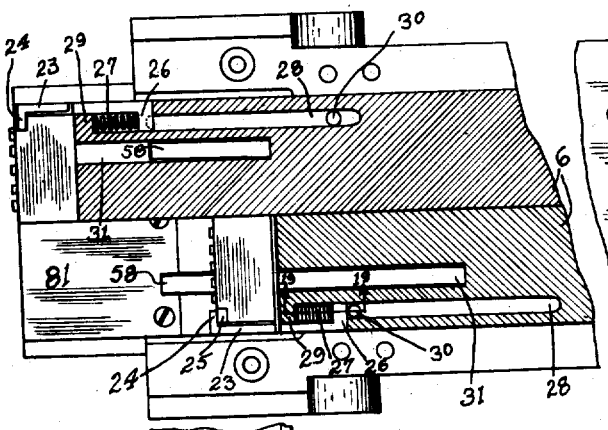
Figure 10 is a horizontal section through the ram used in my invention, but showing the same in split views, one half representing the ram in one position and the other half representing the ram in another position.
Figure 19:
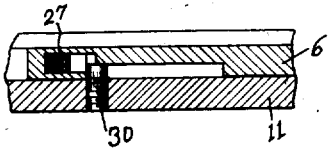

Figure 19 is a section on the line 19—19 of Figure 10.

Figure 2:
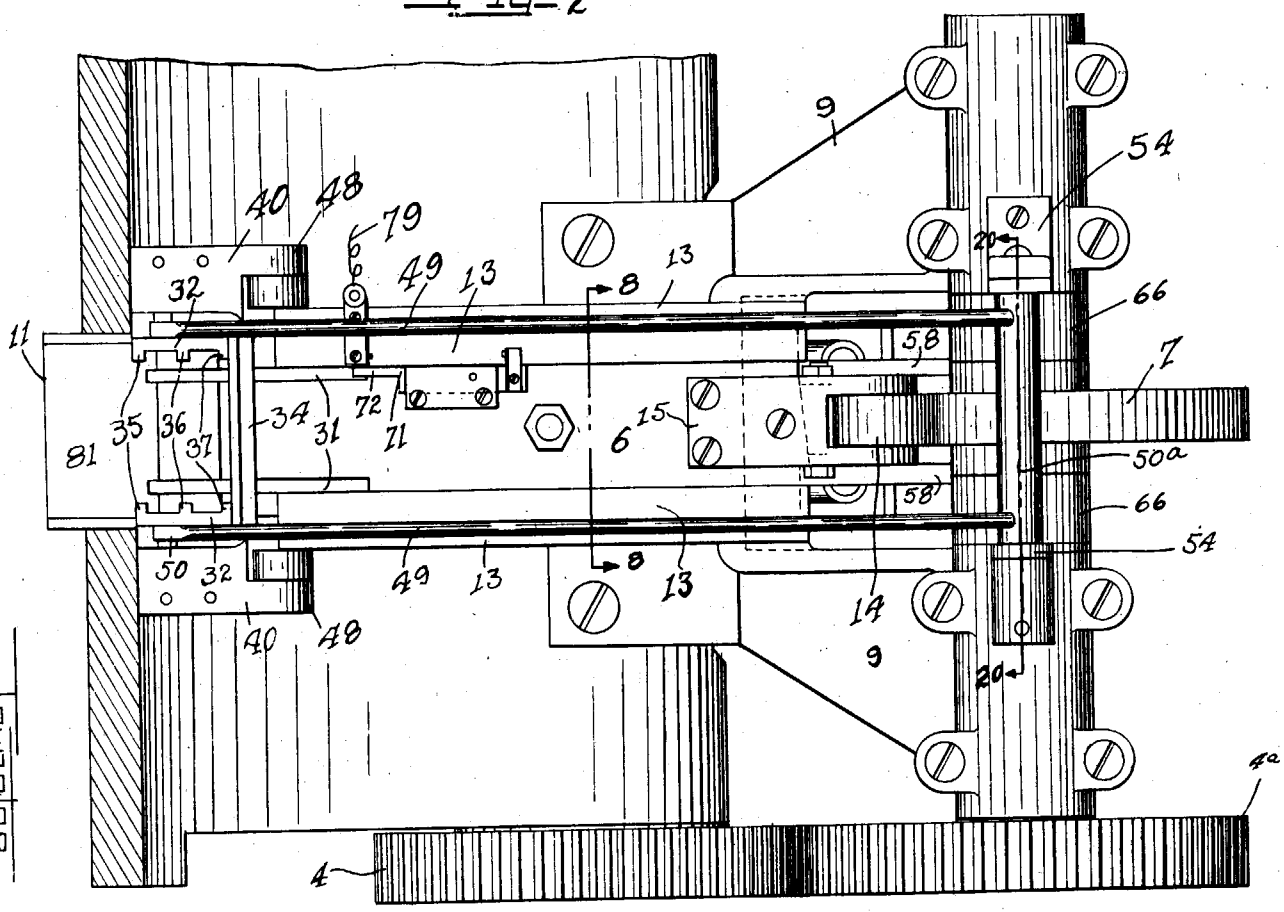
Figure 2 is a top plan view of Figure 1, showing my invention upon an enlarged scale, and omitting parts of the printing press.
Figure 20:
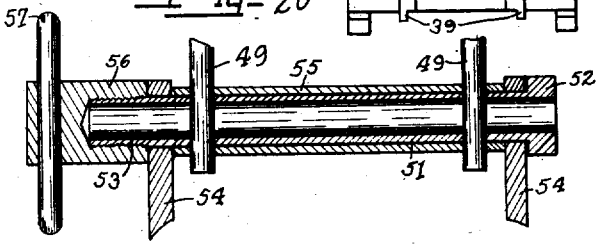

Figure 20 is a sectional detail on the line 20—20 of Figure 2.

Figure 21:
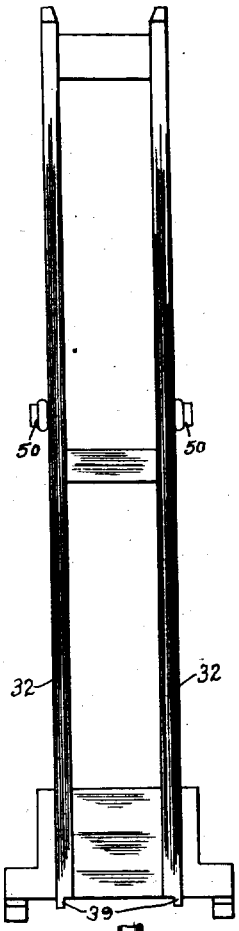

Figure 21 is an elevational view of the slug holders.

Figure 9:
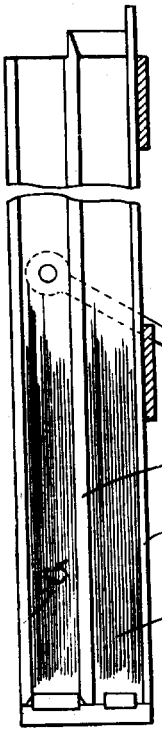
Figure 9 is an elevational view of the slug holders or galleys showing supporting frame members in section.
Figure 1:
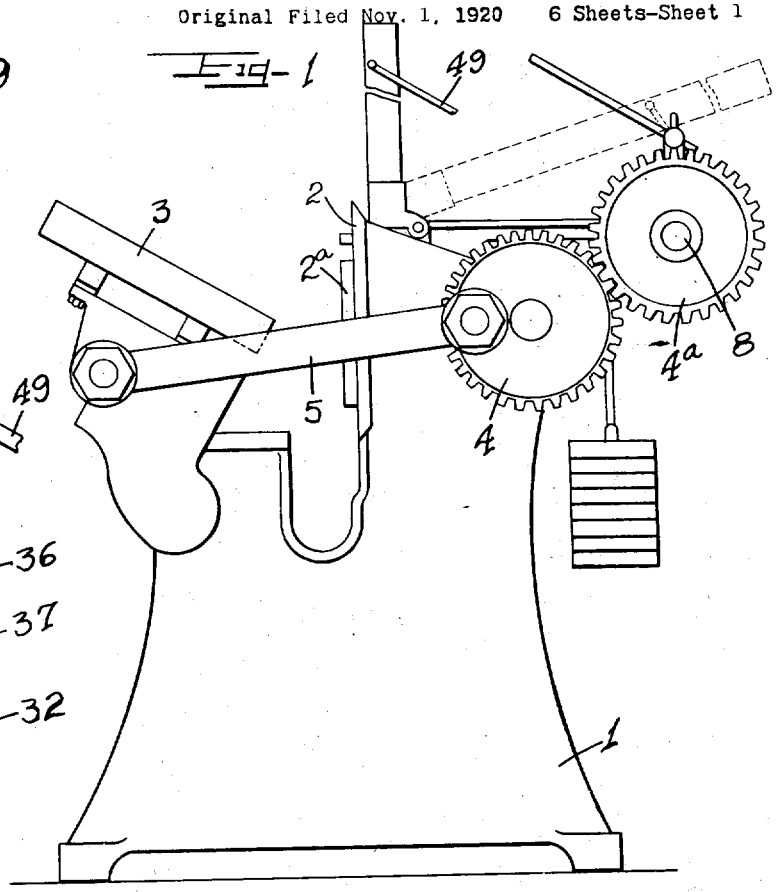

As shown on the drawings:

Referring now more specifically to the drawings, the numeral 1, in Figure 1 represents a printing or embossing press, of usual construction having a printing bed plate 2 which includes a letter chase 2ª or the like and platen 3 which is connected to a gear 4 by means of a link 5. The chase 2ª is designed to receive the form type and have an inking ribbon drawn thereover, and the form letters are pressed between the ribboned plate and the platen 3 when the latter is oscillated into contact therewith as is well known in the art. While embossing presses are adapted and used to print form letters by using a ribbon, they change their function when so used, so the press used with my invention will herein be termed a printing press or device. My invention comprises mechanisms driven by gear 4 and so timed that a block or slug of linotype consisting of several lines is projected adjacent the chase 2 as shown in Figure 17 during every oscillation of the platen 3, whereby a name and address or some individual or special matter may be printed simultaneously with the printing of the body of the letter.

Figure 11:
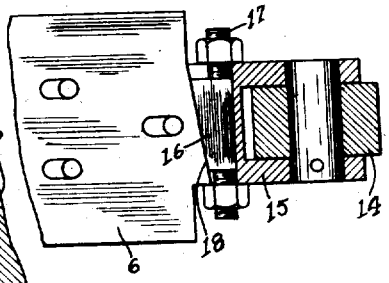
Figure 11 is a section on the line 11—11 of Figure 3 showing an adjustment for the ram.

While this mechanism may assume different modifications, I have illustrated in the present embodiment of my invention a ram or reciprocating element 6 operated by a cam 7, secured on a shaft 8 supported by brackets 9 secured to the press 1. Said cam being so constructed that said ram will stop at intervals, or dwells at predetermined points. A gear 4ª is secured on shaft 8 and meshes with gear 4 for rotating the shaft and said cam 7. The ram 6 is slidingly supported upon a platform or runway 11 leading to the type plate 2 (see Figs. 3 and 8) secured to the press in suitable manner, the platform 11 having guideways 12 formed by projecting flanges 62, in which the ram operates, and guide plate 13 overlapping the outer portions of the ram 6. The rear part of the ram is preferably provided with a cam contacting roller 14 mounted in a bifurcated and adjustable attaching member 15 (see Fig. 11); an adjustable wedge 16 operated by a screw 17 is located between the bifurcated member 15 and the end of the ram 6 which has an inclined part 18 against which the inclined part of the wedge 16 is located. By properly adjusting the wedge 16, the ram will be adjusted due to the slotted bolt connection to reciprocate the proper distances for receiving and feeding slugs of type.

The ram is operated in the forward direction by the cam 7, and the return movement is effected through the instrumentality of a weight 19, which always keeps the roller 14 in contact with cam 7 and which is supported by a chain 20 trained over a pulley 21 and connected to the ram 6 by means of a stud 22; the pulley being rotatably mounted upon the printing press in any approved manner. The forward end of the ram 6 is designed to contact with the slugs of type in the act of projecting the same in the plane of the chase 2ª, and to securely hold the slugs, a latch member 23 is provided on each side of the forward part of the ram. These latch members 23 are preferably set in recessed portions in the sides of the ram and they are provided with right angled claws or projections 24 adapted to enter cut out portions or depressions 25 in the ends of the slugs. The opposite or rear ends of the latch members 23 are provided with abutments 26 which are designed to contact with compression springs 27 mounted in grooves 28 in the ram 6 and abutting against end flanges 29 at the corners of the ram as shown in Figure 10 which shows the ram divided into two parts for the purpose of illustrating the relation of the latch members and the slugs at both the forward and initial points of travel. In the forward position as exemplified in the upper half of Figure 10, the springs 27 have a tendency to hold the slugs tightly against the front end of the ram 6; while in the initial position the springs 27 are compressed to allow the claws 24 to move forwardly so that a slug of type can readily fall into position. The compression of the springs is effected through a pair of pins 30 secured in the base 11 and extending through the slots 28 in position to engage the latch abutments 26 as the same are moving rearwardly as shown in the lower half of Figure 10. The forward end of the ram 6 is further provided with a pair of slots 31 for a purpose to be later described.

Figure 16:
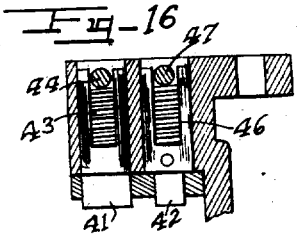
Figure 16 is a section on the line 16—16 of Figure 6 showing the slug holding latches.

Co-operating with the ram above described, I have illustrated a plurality of slug holders or galleys A and B as comprising a further part of my mechanism. These holders are preferably located and suitably supported in the rear of the bed plate and comprise a pair of end plates 32 secured adjacent the opposite inner walls 33 of a U-shaped base 34. These end members have spaced flanges 35, 36 and 37 projecting inwardly thereof to provide a pair of slug holders, the rear one being for new slugs called the feeding holder, and the forward one for used slugs and called the storage holder. The aforedescribed base member 11 extends forwardly in a peculiar curved formation to conform to parts of the press and at the forward end of the same is provided with a grooved horizontal portion 38 having a pair of slots 38[a]; the groove being designed to receive the ram 6 underneath the slug holders as shown in Fig. 6. The end plates 32 have their lower ends provided with grooves 39 opening inwardly to receive the ends of the ram 6. The U-shaped base 34 has oppositely directed side flanges 40 which are supported on the base portion 38 and each flange is provided with a plurality of grooves in the lower face thereof to receive spring pressed detents 41 and 42, (see Figs. 6 and 16).

The detents 42 represent the ones used in the rear or new slug holder A, while the detents 41 represent the ones in the forward or used slug galley B. As shown, the detent 41 slides on the base 38 and enters an aperture in the end plate 32 of the holder and projects a short distance therein; the end thereof being bevelled upwardly so that when a used slug is projected upwardly in said holder, the detent can be forced back against the spring 43 to admit the used slug in the holder after which it may snap back to hold the slug in place. The spring 43 may be held in place by a screw 44 or any other appropriate means. The detent 42 likewise slides on the base 38 and is designed to enter an aperture in the adjacent end plate 32 when in released position. But detent 42 is normally held in retracted position by means of a pin 45 having one end screwed into the detent and the other fitting in a counter-sunk hole in the base portion 38. A compression spring 46 presses against the outer end of the said detent 42, and being held in position by a screw 47 screwed in a flange 40. The function of this detent 42 is to keep the slugs in the holder when the latter is filled by the operator. The holder is usually swung rearwardly on its pivot when being refilled as shown in Figure 1, thus raising pin 45 so that spring 46 can slide the detent 42 inwardly to obstruct the new slugs as they are dropped into the holder. For this purpose, the slug holder is pivotally mounted upon its rear side, by means of hinge lugs 48 on the flanges 40 of base member 34 in any appropriate manner, and to secure the holder in position so that it may be released and swung rearwardly, the same is provided with a pair of rods 49 pivoted to trunnions 50 intermediate the upper and lower ends of said holder. These rods extend rearwardly where they are adjustably secured in a clamping mechanism 50[a] mounted upon the journal bearings of shaft 8 (see Figure 2). In Figure 20, I have illustrated one form of clamping mechanism which may be used, the same comprising a sleeve 51 having a shouldered head 52 and a threaded end 53, supported upon spaced brackets 54, one adjacent the head 52 and a threaded end 53, supported upon spaced brackets 54, one adjacent the head 52 and the other adjacent the screw threaded end 52; and a sleeve member 55 surrounding the sleeve 51 between the said supports 54. Holes are bored diametrically through these sleeves to slidingly admit the rods 49. And relative longitudinal movement of these sleeves will firmly clamp the rods in said holes. Relative sliding movement of the sleeves is effected through the instrumentality of a hand operated knob 56 threaded upon the end of sleeve 51 with its inner end abutting one of the brackets 54; and operating handle inserted in a hole in the knob 56 may be used in turning the knob.

Figure 8:
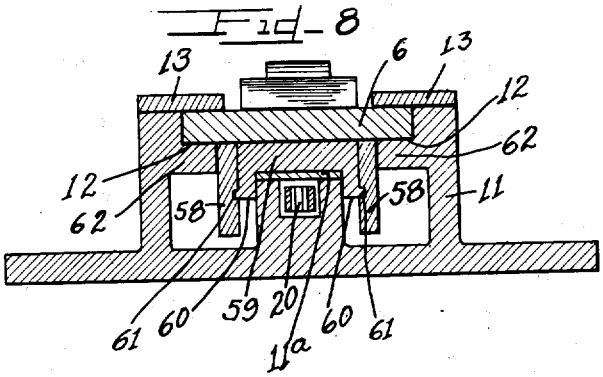
Figure 8 is a section on the line 8—8 of Figure 2.
Figure 3:
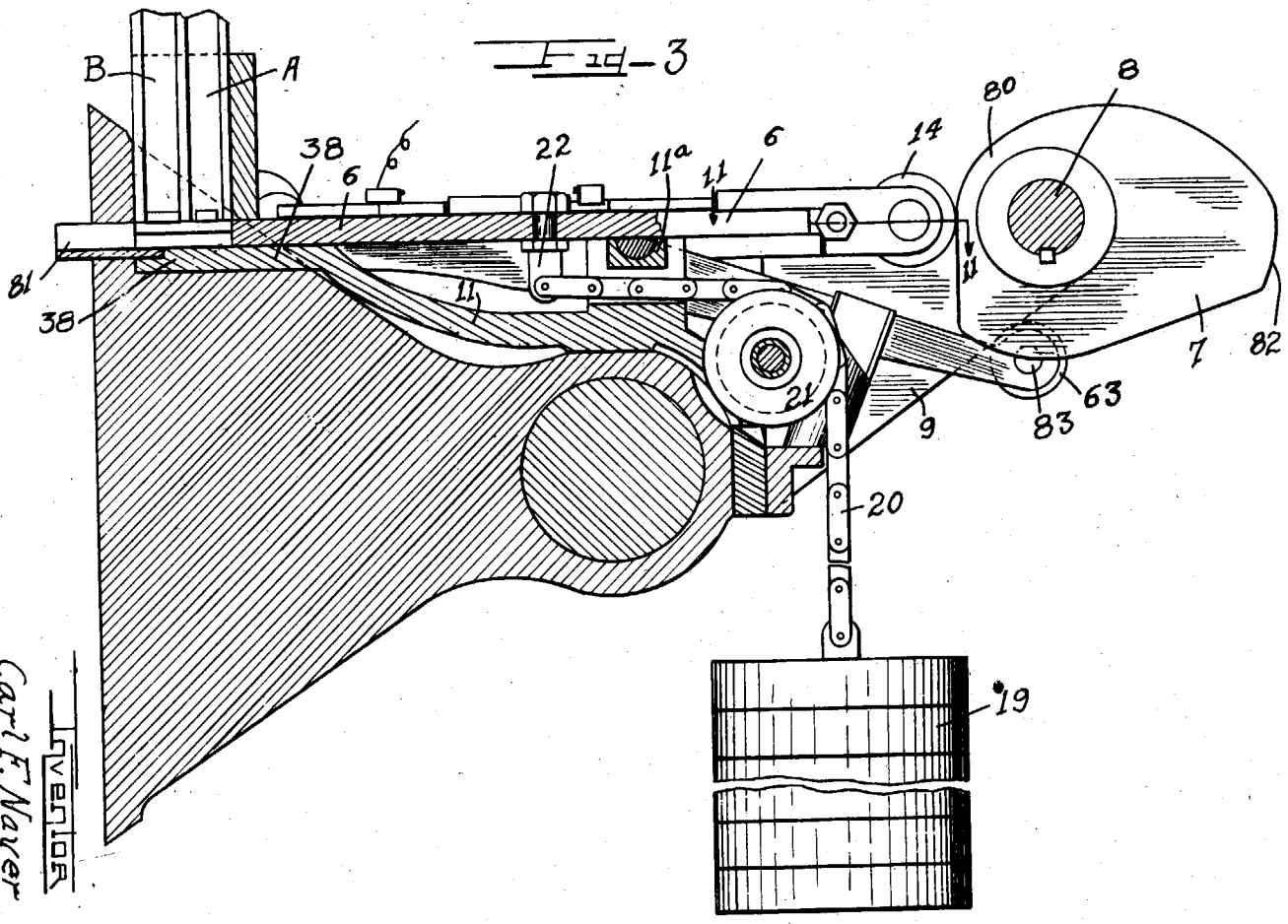
Figure 3 is a section through a part of the mechanism involving my invention, showing the operation of certain features, on an enlarged scale.
Figure 15:
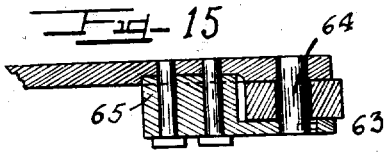
Figure 15 is a section on the line 15—15 of Figure 4.

The used slugs are adapted to be forced upwardly into the holder B by a plurality of timed devices which comprises a further part of my mechanism; and while these devices may be widely varied, I have illustrated in the present embodiment of my invention a pair of spaced levers 58 fulcrumed by means of a bearing 59 rotatably supported upon the base 11 in a bearing 11[a] as shown in Figures 3 and 8. The bearing 59 has an arcuate flange 60 on each side, to which the levers are secured, and these flanges have at their outer ends, horizontally extending arcuate beads or ridges to fit in arcuate grooves 61 in a side of the levers 58. The levers 58 and bearing 59 have a working fit between the flanges 62 formed on the base 11 and extending inwardly thereof. By this arrangement, the levers are constrained to operate as a unit. These levers are provided at their rear ends with rollers 63 mounted upon pintles 64 (see Figure 15) secured in bifurcations formed by the ends of the levers and blocks 65 bolted to the levers. Cams 66 are mounted on the shaft 8 and are adapted to strike the rollers 63 to operate the levers 58 at the proper time to raise the forward ends thereof. The base support near the rear end of each lever is provided with a yieldingly supported plunger 67 mounted in a suitable bore, having a spring 68 at the bottom thereof to constantly force the plunger upwardly. The upper end of each plunger is designed to press against a lever 58 tending to force the forward end down after the same has been elevated by the cam 66. The levers have their upper surfaces receding on a bevel from the center line in order to meet the requirements of the structure in producing a compact arrangement, and the ram 6 is provided with grooves in its under surface which terminate in the aforementioned slots 31 to receive said levers 58 during portions of their operative strokes. The forward ends of the levers are provided with raised contact portions 69 and 70, the portion 69 being higher than the portion 70.

Figure 7:
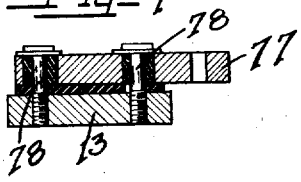
Figure 7 is a section on the line 7—7 of Figure 5.

In connection with the aforedescribed mechanism, I have provided means whereby the operating mechanism of the press may be stopped when the unused slug holder A is depleted of slugs. For this purpose (see Fig. 5) the ram 6 is provided with a bar 71 having a narrow forward end 72 designed to enter an aperture 73 leading into the holder A, and a contact arm 74 secured at right angles thereto at the rear end. This bar 71 is held in position on the ram 6 by means of a plate 75 secured to the ram 6, and a yielding operative connection is provided between the bar 71 and plate 75 by means of a spring 76 secured by a pivot to the plate 75 at one end thereof and abutting a shoulder in a slot in the bar 71 as shown in Figure 5. The arm 74 is adapted to contact at certain times with an insulated contact piece 77 secured to a guide plate 13 by bolts 78 which are insulated. The insulation of the piece 77 and bolts 78 is such that no electric current can pass through the plate 13 as shown in Figure 7. A wire 79 is shown connected to the piece 77, and this wire may be part of a signal or bell circuit or a solenoid switch circuit for throwing the operating motor of the press out of action, and the contact arm 74 may be grounded. I have not illustrated the signal or bell nor the switch mechanism nor the motor since the same are well known in the arts. Accordingly as long as any slugs remain in the holder A, the end 72 of the arm 71 will abut thereagainst and prevent contact of the arm 74 and piece 77; but as soon as the holder A is depleted, the end 72 will enter the aperture 73 far enough to bring the pieces 74 and 77 into contact and close the switch circuit to ring the signal or bell or stop the motor; the spring 76 providing a yielding connection whereby the operation of the ram is not stopped by the contact or the obstruction of bar 71.

Figure 12:
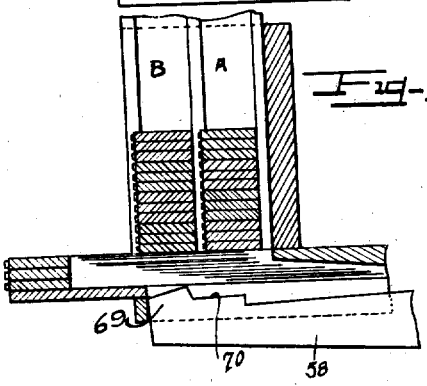
Figure 12 is a detail view showing the slug holders or galleys and operating mechanism for the slug in one position.
Figure 13:
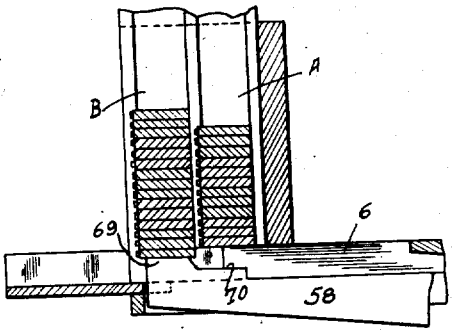
Figure 13 is a view similar to Figure 12 but showing the slug operating mechanism in a different position.
Figure 14:
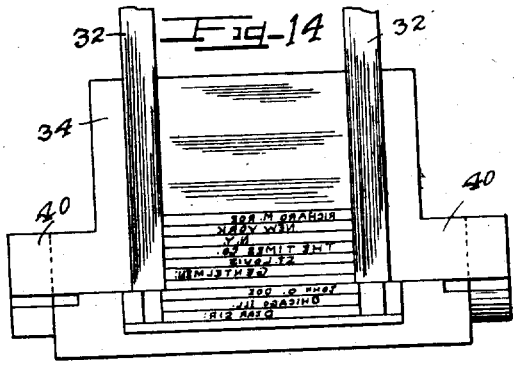
Figure 14 is an elevational view of the front part of the slug holders.

Operation: Assuming that the rear compartment or holder A has been filled with slugs, and the printing press is in operation the gear 4 will drive shaft 8 through gear 4ª and if ram 6 is in the position illustrated in the lower half of Figure 10, a block of linotype or slug having an address thereon as shown in Figure 18, will be dropped in place by the levers 58 between the claws 24 and the end of the ram, the ram 6 having a dwell at this point whereby it remains stationary for a short interval, since it will be in contact with a concentric portion 80 of cam 7. Further rotation of cam 7 will advance the slug to the position shown in the upper half of Figure 10 where the same will have been projected in line with the chase 2ª as shown in Figure 17 and upon a shelf 81 forming a part of the runway or platform 11 and extending through the slot or opening in the wall of the printing press, and the cam 7 will have rotated to bring the portion 82 thereof into contact with the ram roller 14, and the platen 3 of the printing press will be at this time in position to press a form letter paper against the inking ribboned chase 2ª. After the letter has been printed, the platen 3 will recede from the chase 2ª and the weight 19 will withdraw the ram according to the contour of cam against which the roller 14 is held by the said weight, and when the ram has been withdrawn until the slug of type is directly under the forward or used slug holder B, the roller 14 will be contacting with the concentric portion 83 of cam 7, whereby the ram will have another dwell and remain stationary for a short interval to allow the levers 58 which will be now operated by the cams 66 to ascend through the slots 38ª and 31 and lift the slug past the yielding detents 41 and into the holder B, holding the same for a short interval with portion 70 holding the slug in holder A as shown in Figure 4; the detents snapping immediately back in position to securely hold the used slug in said holder. During this operation of the levers 58, the ram 6 will be withdrawn as shown in Figures 10 and 4 and after the cams 66 have passed out of contact with the rollers 63 on the rear ends of the levers 58, the yieldable plungers 67 will force the forward end of the levers 58 downwardly with a fresh slug resting on the portions 70 and which slug will be gently deposited in position in front of the ram 6 as shown in the lower half of Figure 10 while the levers pass on through the slots 31 and 38ª to the position shown in Figure 12, and the mechanism will begin another cycle of operations. The ram 6 advances a slug during every oscillation of the platen 3, caused by a complete rotation of gear 4. When the last slug in the holder A has been used and the operator has not noticed it and stopped the press, a signal will be given or the press will be automatically stopped by the aforedescribed means since the end of the bar 71 will not be obstructed now by the slug after it has passed through the aperture 73 and the switch circuit will be closed by the contact of arm 74 and block 77 which can now be brought together. If it is now desirable to remove the used slugs from the holder B and insert new slugs in the holder A, the head 56 of the clamp mechanism 50ª may be rotated to release the rods 49 whereby the same may slide further through the clamping mechanism to allow the holders to pivot rearwardly as shown in Figure 1 in dotted lines. After the holder B has been emptied and the other refilled, the holders may be swung back and clamped in position by the head 56 as is now obvious; after the letters are written, the used slugs may be used to print addresses on the envelopes.

It will accordingly be observed that I have devised a novel mechanism whereby a form letter may have an address printed thereon simultaneously with the printing of the body of the letter, or whereby, an address may be printed on an envelope which is also automatic in its action, and easily adapted for application to existing printing or embossing presses or incorporated in new machines.

I am aware that attempts have heretofore been made to provide machines for printing form letters. I, however, know of no practical or commercial machine of such a character now in use excepting those constructed according to this invention, I therefore do not purpose limiting the patent granted otherwise than necessitated by the prior art or the scope of the appended claims.

I claim as my invention:

1. In a printing device having mechanism for printing form letters, the combination with the driving means thereof, of a device driven thereby, an element operatively controlled by said device and having dwells at predetermined points in its operative course for receiving and discharging type.

2. In a printing device, the combination with the driving mechanism thereof, of type feeding mechanism operatively connected thereto and comprising a reciprocating element having dwells for receiving and discharging type, and a timed and pivoted device adapted for discharging the type from said reciprocating element.

3. In a printing device for printing form letters, the combination with the driven mechanism thereof, of slug feeding and discharging mechanism operatively associated therewith, and comprising a reciprocating ram for feeding slugs and a pivoted lever member operating in timed relation therewith for discharging slugs from said ram.

4. In a printing device having a chase and oscillatable platen co-operating therewith to print form letters, a pair of type holders, slugs in one of said holders, a ram for projecting said slugs in line with said chase during the oscillation of said platen, and withdrawing the same under the other holder, and a timed lever member for projecting said slugs in said other holder.

5. In a printing device for printing form letters, the combination with the chase thereof, of a pair of slug holders, slugs in one of said holders, means for conveying said slugs adjacent said chase and returning the same under the other holder and means for projecting the same into said other holder.

6. In a printing device having a chase, a pair of slug holders, a cam operated and adjustable ram having a dwell under one of said holders for receiving a slug and projecting the same adjacent said chase, and returning the same under the other holder, and a cam operated lever device for projecting said slug into the other holder.

7. In a printing device, a pair of slug holders, a feeding ram having a plurality of slots, a cam for operating said ram in one direction, means for operating said ram in the other direction, said cam being so constructed that said ram will have a dwell under each holder, pivoted levers and means for operating the same in timed relation with said ram, said levers operating through said slots for discharging slugs into one of said holders.

8. In a printing device having a bed plate and a slot in said bed plate, a platform extending through said slot, a pair of slug holders supported above said platform, slugs in one of said holders, and mechanism supported on said platform for projecting a slug through said slot and discharging it thereafter into the other holder.

9. In a printing device having a bed plate, a runway leading to said bed plate, a ram on said runway, means for periodically operating said ram with dwells at predetermined points and means for supplying slugs at one of said points, and discharging the same at the other point.

10. In a printing device having a bed plate, a runway leading to said bed plate, a slug feeding holder on said runway, a storage slug holder on said runway, a slug conveying ram on said runway for feeding slugs to said bed plate, mechanism for operating said ram with dwells under each holder for receiving slugs from the feeding holder, and allowing the same to be discharged into the storage holder.

11. In a printing device a type holder, means for pivoting the same upon said device and clamping and adjustable mechanism for said holder whereby the same may be swung on its pivot.

12. In a printing device, a feeding slug holder, a reciprocating ram having means for entering said holder when the same is empty and a device co-operating with said means when the same has entered said holder for making an electrical contact.

13. In a printing device, a feeding slug holder, a reciprocating ram, having a yieldable device for entering said holder, when the same is empty, a support, means on said support and ram designed to be brought into contact when said device has entered said holder for indirectly causing said ram to stop.

14. In a printing device, a pair of slug holders, slugs in one of said holders, means for projecting said slugs from one of said holders and withdrawing the same to the other holder and means for ejecting the slugs into said other holder and carrying slugs from the first mentioned holder in position before the said means.

15. In a printing device, a feeding slug holder, a storage slug holder, a runway for supporting the same, a reciprocating element mounted on said runway for advancing slugs on the feeding runway and a pivoted device for projecting slugs into said storage holder and conveying slugs from the feeding holder to said runway.

16. In a printing device a bed plate, a runway leading thereto, a storage slug holder mounted on the runway, a feeding slug holder mounted on the runway, reciprocating means on said runway for advancing slugs from the feeding holder to said bed plate and withdrawing the same to the storage holder, a pivoted lever having a plurality of raised portions for ejecting slugs into the storage holder and conveying slugs from the feeding holder to said runway.

17. In a printing press, a reciprocating type carrying member having yieldable type retaining means for forming a type holding recess, and a stop coacting with said means for expanding said type holding recess.

18. In a printing press for printing form letters, a bed plate having an opening, a reciprocating slug carrier having claw members adapted for engaging and projecting slugs through said opening, a pair of slug holders, means for feeding a slug from one of said holders to said carrier, an oscillatable platen, mechanism for operating said slug carrier and platen, and means operated by said mechanism for discharging a used slug from said carrier into the other holder.

19. In a printing press for printing form letters, a bed plate having an opening therethrough, an oscillatable platen, driving mechanism for oscillating said platen, a reciprocating type carrier driven by said mechanism in timed relation with said platen for advancing a slug through said opening, a pair of slug holders and means controlled by said driving mechanism for feeding a slug from one holder to said carrier and discharging the used slug therefrom into the other holder.

20. In a printing press comprising a bed plate having an opening and an oscillatable platen, the combination with the driving mechanism thereof, of a device reciprocated thereby adapted for receiving a slug of type and projecting it through said opening in timed relation with the operation of said platen and means for feeding a slug to said device and discharging the used slug therefrom.

21. In a printing press having a bed plate provided with an opening therein and an oscillatable platen, a feeding slug holder, a storage slug holder, a reciprocating slug carrier adapted for receiving slugs from the first holder and projecting the same through said opening, a bearing for guiding said carrier in its movements and means for discharging the used slugs from said carrier into the other holder.

22. In a printing press having a printing bed plate and an oscillatable platen with driving means for oscillating said platen, a pair of slug galleys supported in the rear of said bed plate, a runway leading from said bed plate into operative relation with said galleys, a reciprocating slug carrier slidably supported on said runway, and reciprocated in timed relation with the operation of said platen for advancing slugs in operative relation with said bed plate, and means operated in timed relation with the reciprocation of said carrier for feeding slugs thereto from one galley and discharging the same therefrom into the other galley.

23. In a printing press having a bed plate, provided with an opening and an oscillatable platen with driving means for oscillating the platen, a pair of slug galleys supported in the rear of said bed plate, a bearing extending from said bed plate into proximity with said galleys, and a device reciprocating on said bearing and comprising means for receiving a slug from one galley and projecting the same through the opening in said bed plate in timed relation with the operation of the platen.

24. In a printing press having a bed plate provided with an opening and an oscillatable platen, the combination with the driving mechanism thereof, of a slug carrier for projecting slugs through said bed plate driven thereby and having a slug receiving dwell and a slug discharging dwell, and a discharging element operating in timed relation with the latter dwell for ejecting slugs from said carrier.

25. In a printing device for printing form letters, the combination with the driving mechanism thereof, of a slug carrier operatively connected therewith for reciprocation thereby said carrier having a slug feeding dwell, a printing dwell and a discharging dwell, said dwells occurring in different positions of said carrier and means for feeding slugs to said carrier and discharging the same therefrom.

26. In a printing press having a bed plate provided with an opening and an oscillatable platen with means for oscillating said platen, slug feeding and discharging means, a guide bearing extending from said bed plate to said means, and a reciprocating slug carrier mounted upon said guide bearing and operated in timed relation with said platen for receiving slugs from said feeding means and projecting the same through said opening in timed relation with the operation of the platen.

27. In a printing press having a bed plate provided with an opening and an oscillatable platen, a platform extending into said opening, a reciprocating slug carrier mounted upon said platform and having slug retaining means upon its forward end, means for oscillating said platen and reciprocating said carrier and means for supplying slugs to said carrier and ejecting the same therefrom.

28. In a printing press, having a bed plate, provided with an opening and an oscillatable platen, a platform extending into said opening, a reciprocating slug carrier mounted upon said platform, said carrier having slots, a feeding slug holder and a storage slug holder supported above said platform, means for operating said platen and carrier, and a lever mechanism operated by said means and adapted for extending through the slots in said carrier for feeding slugs from one holder to said carrier, and discharging the same therefrom into the other holder.

29. In a printing press having a bed plate provided with an opening and an oscillatable platen, a platform extending into said opening, a slug carrier mounted for reciprocation on said platform, means for feeding slugs to and ejecting them from said carrier, mechanism for operating said platen and advancing said slug carrier through said opening and independent means for retracting said slug carrier for the purpose set forth.

30. In a printing press having a bed plate provided with an opening and oscillatable platen, with mechanism for oscillating said platen, a platform leading to said opening, a reciprocating slug carrier mounted upon said platform, means for supplying slugs to said carrier, a cam connected to said mechanism for advancing said slug carrier to enter said opening and independent means for retracting said carrier according to the contour of said cam.

31. In a printing press having a bed plate with a chase and an oscillatable platen, means for projecting slugs into the plane of said chase comprising a reciprocating member having movable claw members and means for controlling the movements of said claw members during the operative movements of said reciprocating member.

32. In a printing press having a bed plate provided with an opening, a reciprocating member adapted for projecting slugs through said opening, said member having movable slug retainers and means in the path of said retainers for controlling the movements thereof.

In testimony whereof I have hereunto subscribed my name in the presence of two subscribing witnesses:

CARL F. NAYER.

Witnesses:

JOHN VANDENBURG,

WILLIAM C. ELLWOOD.